US010530461B2

(12) United States Patent
Sadiq et al.

(10) Patent No.: US 10,530,461 B2
(45) Date of Patent: Jan. 7, 2020

(54) RELAY DISCOVERY AND ASSOCIATION MESSAGES

(71) Applicant: QUALCOMM Incorporated, San Diego, CA (US)

(72) Inventors: Bilal Sadiq, Basking Ridge, NJ (US); Hong Cheng, Basking Ridge, NJ (US); Sudhir Kumar Baghel, Bridgewater, NJ (US); Michaela Vanderveen, Tracy, CA (US); Saurabha Rangrao Tavildar, Jersey City, NJ (US); Haris Zisimopoulos, London (GB); Shailesh Patil, Raritan, NJ (US); Kapil Gulati, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 33 days.

(21) Appl. No.: 15/065,552

(22) Filed: Mar. 9, 2016

(65) Prior Publication Data
US 2016/0285539 A1    Sep. 29, 2016

Related U.S. Application Data

(60) Provisional application No. 62/138,288, filed on Mar. 25, 2015.

(51) Int. Cl.
*H04B 7/155* (2006.01)

(52) U.S. Cl.
CPC .............................. *H04B 7/15507* (2013.01)

(58) Field of Classification Search
CPC ..... H04W 8/005; H04W 40/22; H04W 48/14; H04W 76/02; H04W 76/023; H04B 7/15507

See application file for complete search history.

(56) References Cited

U.S. PATENT DOCUMENTS

2008/0117923 A1*  5/2008  Otte ................... H04L 29/06027
                                                                      370/401
2011/0134827 A1*  6/2011  Hooli .................... H04W 72/04
(Continued)

FOREIGN PATENT DOCUMENTS

| EP | 2833694 A2 | | 2/2015 | |
|---|---|---|---|---|
| WO | WO 2015/142080 | * | 9/2015 | ............ H04W 28/02 |
| WO | WO 2016153264 | * | 9/2016 | ............ H04W 72/12 |

OTHER PUBLICATIONS

3GPP TR 23.713 V1.0.0: "3rd Generation Partnership Project, Technical Specification Group Services and System Aspects, Study on Extended Architecture Support for Proximity-Based Services (Release 13)", 3GPP Draft, 3rd Generation Partnership Project (3GPP), Mobile Competence Centre, 650, Route Des Lucioles, F-06921 Sophia-Antipolis Cedex, France, Mar. 4, 2015 (Mar. 4, 2015), pp. 1-59, XP050961131, Retrieved from the Internet: URL: http://www.3gpp.org/ftp/tsg_sa/WG2_Arch/Latest_SA2_Specs/Latest_draft_S2_Specs/ [retrieved on Mar. 4, 2015] paragraph [0006].
(Continued)

*Primary Examiner* — Ronald B Abelson
(74) *Attorney, Agent, or Firm* — Arent Fox LLP

(57) ABSTRACT

A user equipment (UE) may be outside of the coverage area of a base station or other access point, which may impede access by the UE of a core network, server, or the like. Therefore, a UE may establish a relay connection to access resources when the UE is outside of a coverage area provided by a base station or access point. In aspects, an apparatus may be configured to transmit, to a set of relay UEs, a first message associated with establishment of a relay connection. The apparatus may be further configured to receive a set of messages from the set of relay UEs. The apparatus may be further configured to establish the relay
(Continued)

connection with a first relay UE of the set of relay UEs based on a message of the set of messages from the first relay UE.

22 Claims, 11 Drawing Sheets

(56) References Cited

U.S. PATENT DOCUMENTS

| | | | |
|---|---|---|---|
| 2013/0294331 A1 | 11/2013 | Wang et al. | |
| 2014/0044036 A1* | 2/2014 | Kim | H04W 72/0446 370/315 |
| 2014/0119272 A1 | 5/2014 | Wong et al. | |
| 2014/0308955 A1* | 10/2014 | Won | H04W 36/30 |
| 2015/0215903 A1* | 7/2015 | Zhao | H04W 72/04 370/329 |
| 2015/0271720 A1* | 9/2015 | Yamada | H04W 76/023 370/331 |
| 2015/0305012 A1* | 10/2015 | Yi | H04L 67/1078 370/329 |
| 2016/0150513 A1* | 5/2016 | Wu | H04W 72/04 370/329 |
| 2016/0269185 A1* | 9/2016 | Stojanovski | H04L 9/3247 |
| 2016/0374110 A1 | 12/2016 | Lee et al. | |
| 2017/0215059 A1 | 7/2017 | Agiwal et al. | |
| 2017/0359766 A1* | 12/2017 | Agiwal | 40/22 |

OTHER PUBLICATIONS

3GPP TS 23.303 V12.4.0: "3rd Generation Partnership Project, Technical Specification Group Services and System Aspects, Proximity-based Services (ProSe), Stage 2 (Release 12)", 3GPP Draft, 3rd Generation Partnership Project (3GPP), Mobile Competence Centre, 650, Route Des Luciioles, F-06921 Sophia-Antipolis Cedex, France, Mar. 24, 2015 (Mar. 24, 2015), pp. 6-64, XP050961167, Retrieved from the Internet: URL:http://www.3gpp.or/ftp/tsg_sa/WG2 Arch/Latest SA2_Specs/Rel-12/ [retrieved on Mar. 24, 2015] paragraph [4.5.4] paragraph [4.6.3]—paragraph [4.6.4]paragraph [05.3] paragraph [5.4.4].

International Search Report and Written Opinion—PCT/US2016/021788—ISA/EPO—dated May 19, 2016.

LG Electronics: "Solution on Relay for Public Safety ProSe", 3GPP Draft, S2-132614_P-CR_23703_Relay_V3, 3rd Generation Partnership Project (3GPP), Mobile Competence Centre, 650, Route Des Lucioles, F-06921 Sophia-Antipolis Cedex, France, vol. SA WG2, No. Valencia, Spain, Jul. 15, 2013-Jul. 19, 2013, Jul. 9, 2013 (Jul. 9, 2013), pp. 1-6, XP050725994, Retrieved from the Internet: URL: http://www.3gpp.org/ftp/tsg_sa/WG2_Arch/TSGS2_98_Valencia/Docs/ [retrieved on Jul. 9, 2013] paragraph [0001] paragraph [6.X.Y].

Ericsson: "Signalling Required for UE-NW Relay Selection", 3GPP Draft; R2-152462—Signalling Required for UE-NW Relay Selection, 3rd Generation Partnership Project (3GPP), Mobile Competence Centre; 650, Route Des Lucioles; F-06921 Sophia-Antipolis Cedex; vol. RAN WG2, No. Fukuoka, Japan; May 25, 2015-May 29, 2015, May 15, 2015 (May 15, 2015), pp. 1-17, XP050972112, Retrieved from the Internet: URL: http://www.3gpp.org/ftp/tsg_ran/WG2_RL2/TSGR2_90/Docs/ [retrieved on May 15, 2015].

"3rd Generation Partnership Project; Technical Specification Group Radio Access Network; Evolved Universal Terrestrial Radio Access (E-UTRA); Physical channels and modulation (Release 12)", 36.211 V12.5.0, 3GPP Draft, DRAFT36211-C50, 3rd Generation Partnership Project (3GPP), Mobile Competence Centre, 650, Route Des Lucioles, F-06921 Sophia-Antipolis Cedex, France, Mar. 18, 2015 (Mar. 18, 2015), XP050948462, pp. 1-135, Retrieved from the Internet: URL:http://www.3gpp.org/ftp/tsg_ran/WG1_RL1/DRAFT/ [retrieved on Mar. 18, 2015].

* cited by examiner

RELAY DISCOVERY AND ASSOCIATION MESSAGES

CROSS-REFERENCE TO RELATED APPLICATION(S)

This application claims the benefit of U.S. Provisional Application Ser. No. 62/138,288, entitled "RELAY DISCOVERY AND ASSOCIATION MESSAGES" and filed on Mar. 25, 2015, which is expressly incorporated by reference herein in its entirety.

BACKGROUND

Field

The present disclosure relates generally to communication systems, and more particularly, to establishing communications links using relay devices.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some wireless communication systems, a base station may provide, for a user equipment (UE), an access point, for example, to a core network or server. However, a coverage area of the base station may be limited. Therefore, a UE can be outside of the coverage area of a base station, which may impede access by the UE of a core network, server, or the like through the base station. The present disclosure describes some aspects that allow a UE to connect to a base station through a relay device, for example, when the UE is out of a coverage area, unable to decode signals from the base station due to interference, and the like. The present disclosure describes an approach in which a UE transmits a message associated with establishing a relay connection and then connects to a relay device that responds to the message.

In an aspect of the disclosure, a method, a computer-readable medium, and an apparatus are provided. The apparatus may be configured to transmit, to a set of relay UEs, a first message associated with establishment of a relay connection. In an aspect, the first message may include an identifier (ID) of the apparatus. The apparatus may be further configured to receive a set of messages from the set of relay UEs. In aspects, each message of the set of messages may include a respective ID of a respective relay UE of the set of relay UEs. The apparatus may be further configured to establish the relay connection with a first relay UE of the set of relay UEs based on a message of the set of messages from the first relay UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
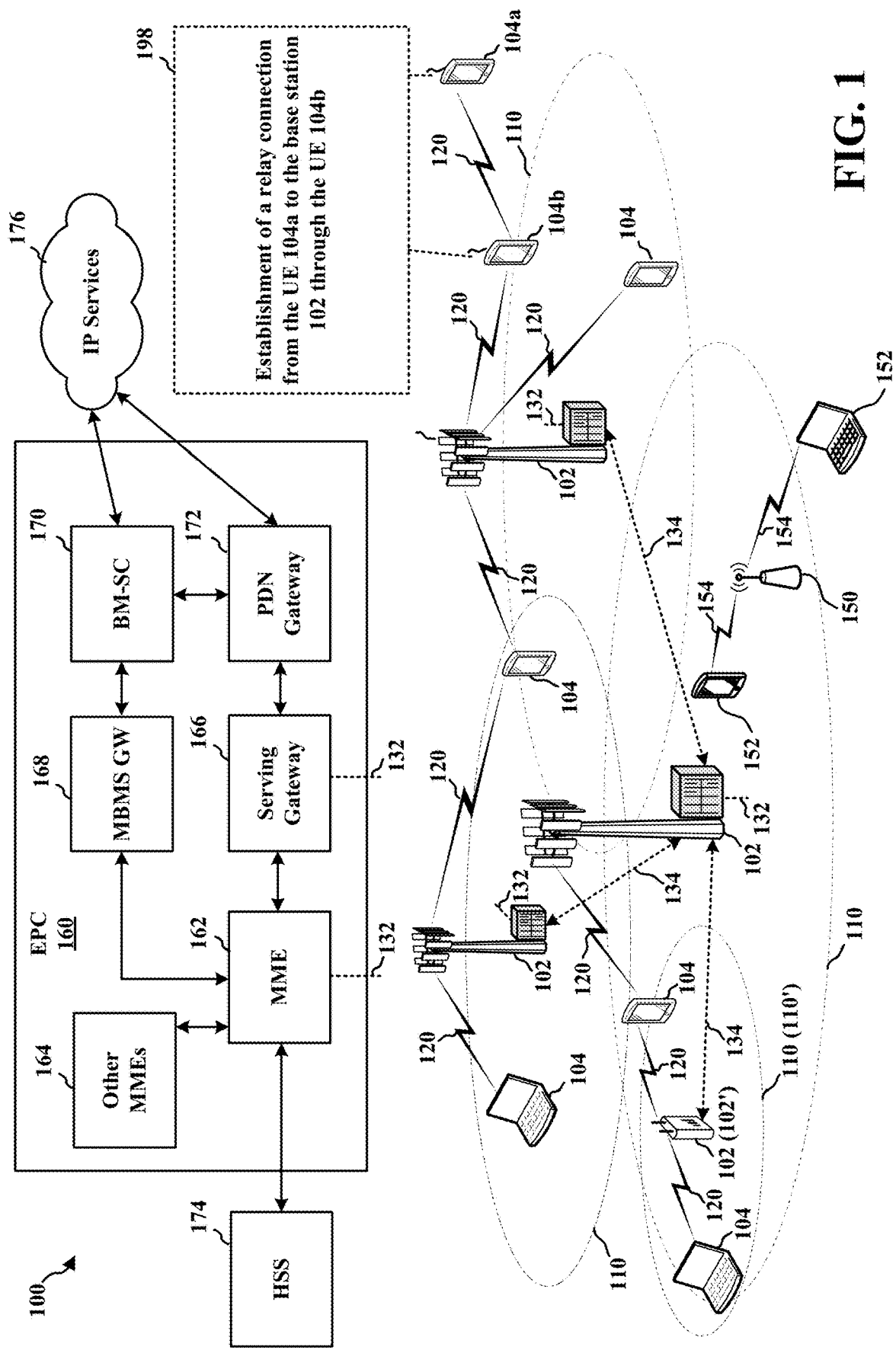
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a UE 104a may be configured to connect to the base station 102 through a relay UE. In certain aspects, a UE 104b may be configured as a relay UE. In certain aspects, the UE 104a may transmit, to a set of relay UEs, a first message associated with establishment of a relay connection. In an aspect, the first message may include an identifier (ID) of the UE 104a. The UE 104a may be further configured to receive a set of messages from the set of relay UEs, including the UE 104b configured as a relay UE. In aspects, each message of the set of messages may include a respective ID of a respective relay UE of the set of relay UEs. The UE 104a may be further configured to establish the relay connection with the relay UE 104b based on a message of the set of messages from the relay UE 104b. In aspects, the UE 104a may communicate over communication links 120 with the base station 102 through the relay UE 104b. Accordingly, the UE 104a may be configured to communicate with one or more of the EPC 160, IP Services 176, and/or HSS 174 over communications links 120 with the base station 102 through the relay UE 104b.

Figure 2:
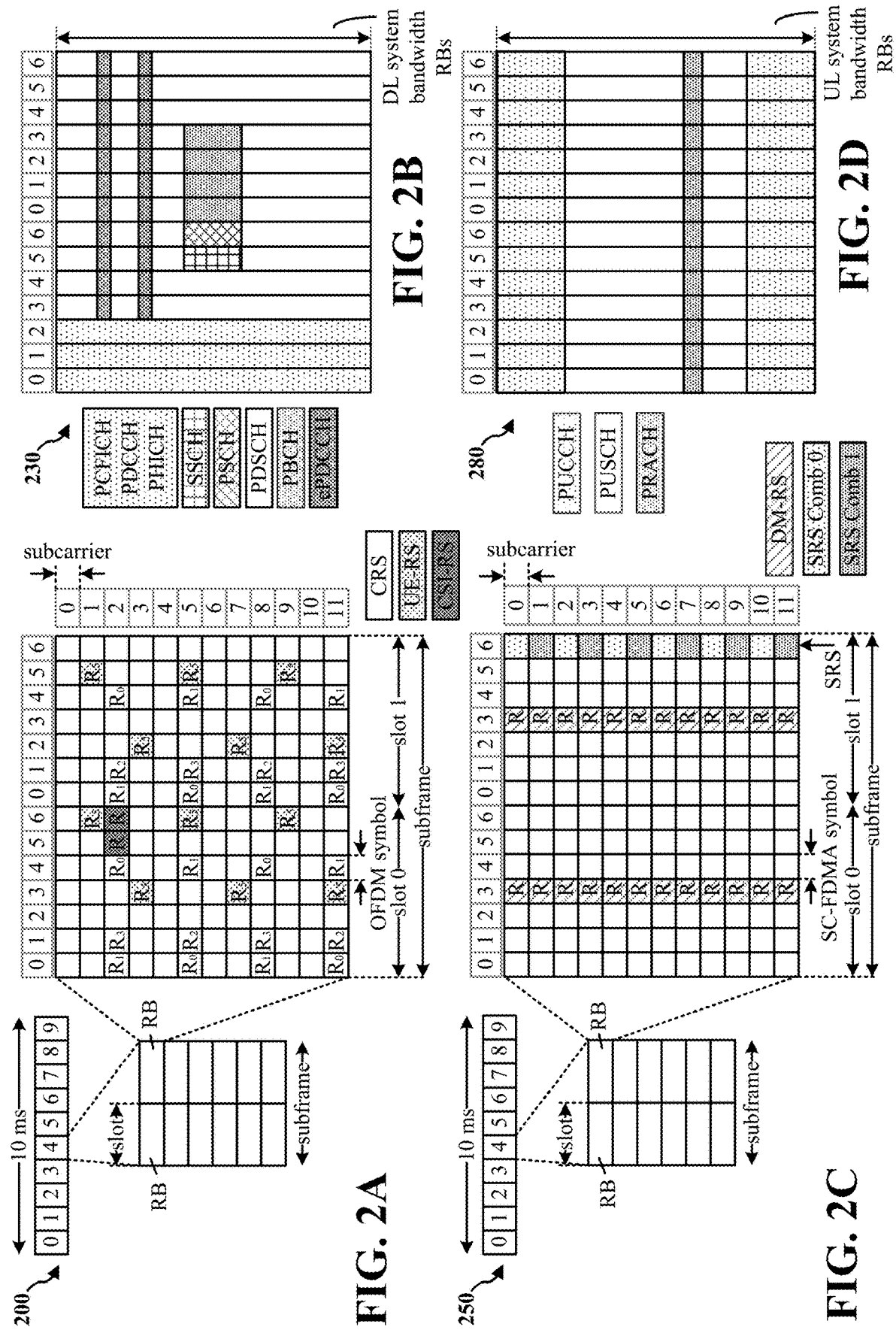
FIGS. 2A, 2B, 2C, and 2D are diagrams illustrating LTE examples of a DL frame structure, DL channels within the DL frame structure, an UL frame structure, and UL channels within the UL frame structure, respectively.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
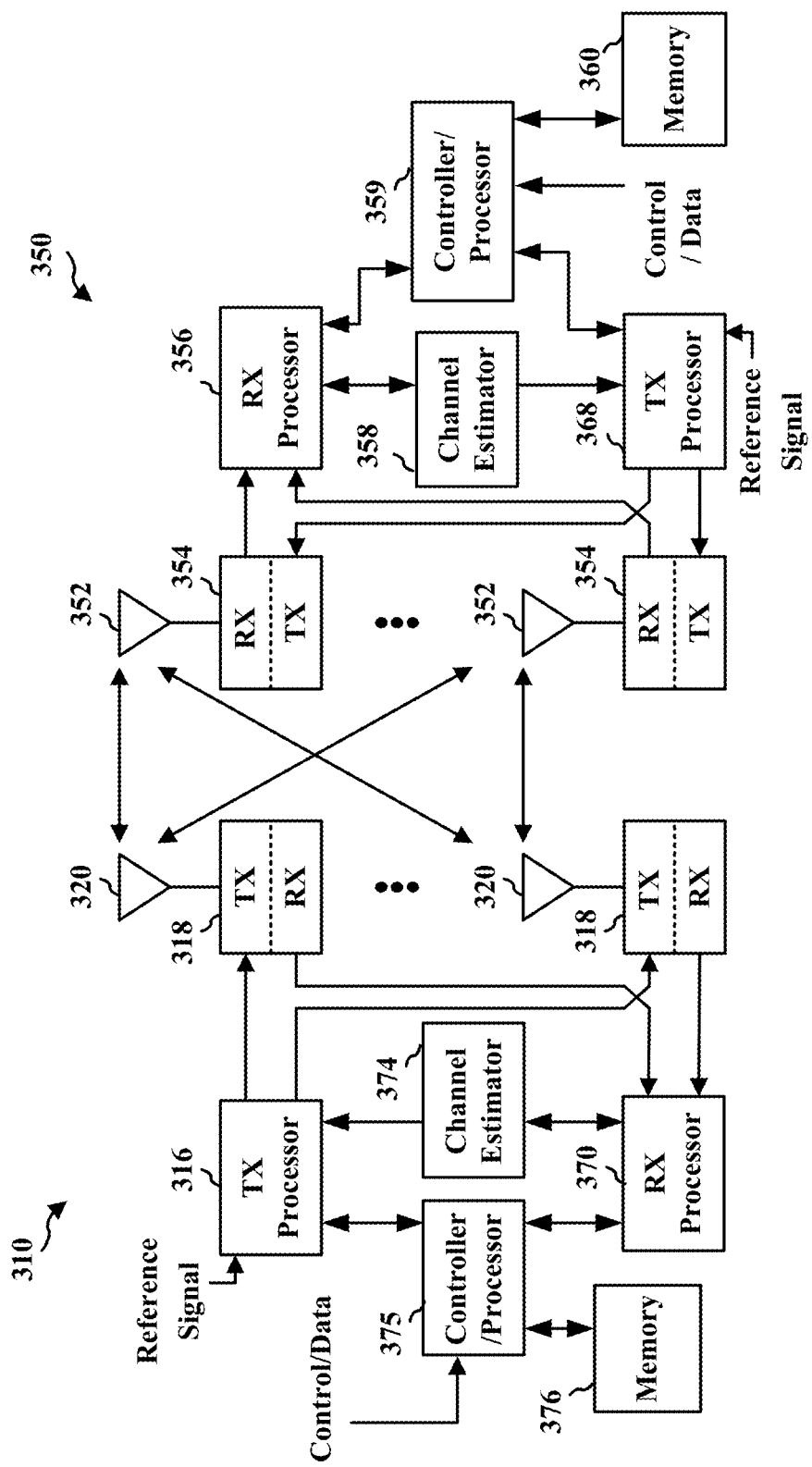
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
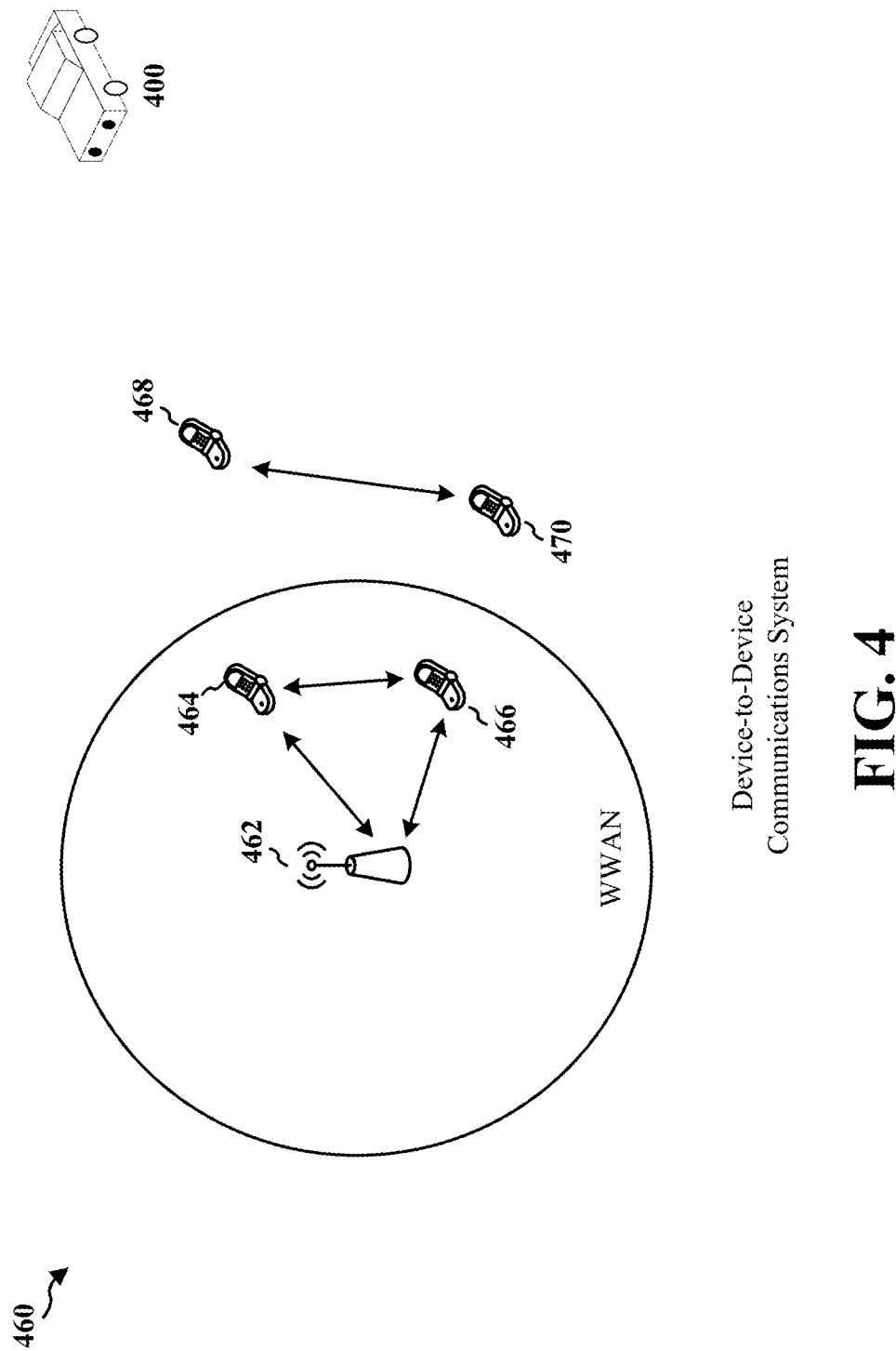
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 5:
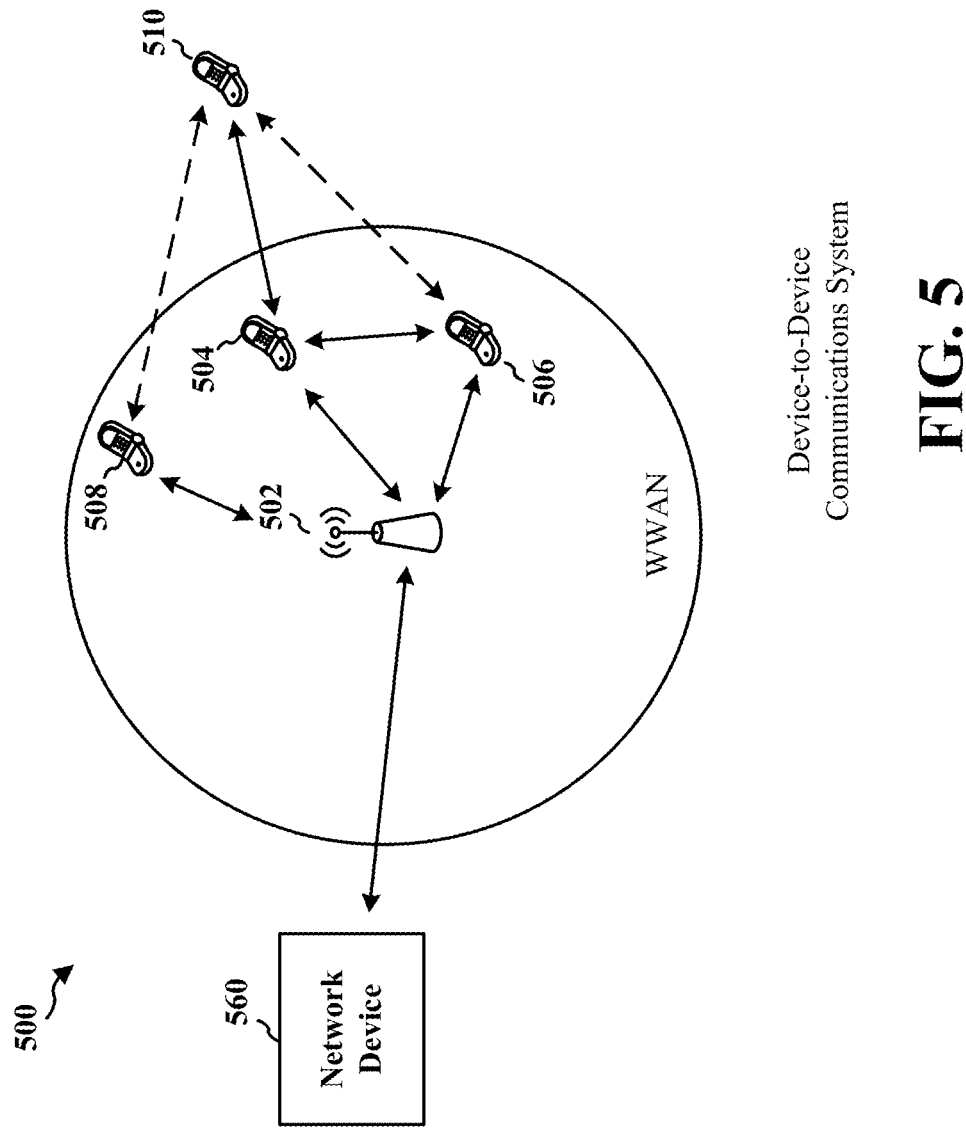
FIG. 5 <non-standard, unique system/frequency/chart/message transfer figure (preferably a visual depiction of what is happening showing UEs, eNBs, arrows of the transmissions) that is unique to this application (if applicable, usually provided by inventors)>.

FIG. 5 is a diagram of a wireless communications system 500. The wireless communications system 500 includes a plurality of UEs 504, 506, 508, 510. One or more of the UEs 504, 506, 508, 510 may be configured for D2D communication, and may be aspects of one of the UEs 464, 466, 468, 470 of FIG. 4. The wireless communications system 500 may include with a cellular communications system, such as for example, a WWAN. The wireless communications system 500 may include a base station 502 that may act as an access point toward a network device 560, for example, for one or more of the UEs 504, 506, 508, 510. Examples of a network device may include a server (e.g., a web server), a gateway, a component of a core network, or another similar device. In aspects, the network device 560 may include a component of the EPC 160, IP Services 176, and/or the HSS 174 of FIG. 1.

In an aspect, a UE 504 may provide proximity-based services (ProSe) to another UE 510, with the UE 504 acting as a relay for the UE 510. The UE 510 may be known as a remote UE or an edge device (e.g., "edge UE" or "EUE"). The UE 504 may be a ProSe UE-to-Network relay node ("relay" or "relay UE"). In an aspect, EUE 510 is outside the range of the coverage area provided by the base station 502 and uses the relay UE 504 to connect to the base station 502. In an aspect, a plurality of UEs 504, 506, 508 may be available to set up a connection as a relay for EUE 510. In an aspect, the EUE 510 may select a relay from the available relay UEs 504, 506, 508 to set up the relay connection to the base station 502.

According to an aspect, the EUE 510 may transmit a first message. This first message may be transmitted as a unicast transmission to each of the relay UEs 504, 506, 508 or as a broadcast transmission. In one aspect, the EUE 510 may transmit the first message on a physical sidelink discovery channel (PSDCH).

In an aspect, this first message may include information about the EUE 510. For example, the first message may include an ID of the EUE 510. In an aspect, the ID may be a link layer identifier associated with the EUE 510, such as a Layer 2 (L2) ID associated with the EUE 510. In an aspect, this first message may include a relay service code, which may indicate information about which the EUE 510 is interested. For example, this first message may identify connectivity information, a service, a resource (e.g., Internet resource), and/or an application in which the EUE 510 is interested.

In an aspect, this first message may include one or more service requirements. The one or more service requirements may include one or more metrics related to a service of interest to the EUE 510 should the EUE 510 establish a connection to the network via one of the relay UEs 504, 506, 508. For example, EUE 510 may require a specified link quality, a specified bit rate, a secure connection, etc. when attempting to establish a relay connection with the base station 502.

In an aspect, this first message may include one or more IDs of one or more PLMNs in which the EUE 510 is interested. Alternatively, this first message may include an indication that the EUE 510 is interested in connecting to any available PLMN.

In an aspect, this first message may include an ID associated with one or more relay UEs, such as one of more of the relay UEs 504, 506, 508. For example, the ID may be a ProSe relay UE ID, which may be a link layer identifier used for direct communication and may be associated with a relay service code. In an aspect, the ID may be an L2 ID associated with one or more relay UEs, such as one or more of the relay UEs 504, 506, 508.

In an aspect, the EUE 510 may transmit the first message to request that relay UEs respond to indicate the availability of the relay UEs. In an aspect, the EUE 510 may transmit the first message to announce that the EUE 510 is interested in a relay UE. The first message may be a discovery announcement message or a ProSe discovery query message.

In an aspect, one or more of the relay UEs 504, 506, 508 that receives the first message may respond with a respective second message. In an aspect, a respective second message from a respective relay UE 504, 506, 508 may include information about the respective relay UE 504, 506, 508. According to one aspect, a respective second message may indicate the availability of the respective relay UE 504, 506, 508 as a relay device. In an aspect, a respective second message may include an ID of a respective relay UE 504, 506, 508. For example, a second message from the relay UE 504 may include a link layer identifier that is used for direct communication and may be associated with a relay service code. In an aspect, the ID may be an L2 ID.

In an aspect, a respective second message may be a relay association message. In an aspect, the second message may include information associated with the relay service available through the relay UE. For example, a second message may include information indicating a service provided through the relay UE (e.g., a ProSe relay service code), one or more PLMN IDs to which the relay UE may connect, one or more access point names (APNs) to which the relay UE may connect, one or more base stations to which the relay UE may connect, or other similar information.

In an aspect, each of the relay UEs 504, 506, 508 may send a respective second message on a physical sidelink shared channel (PSSCH). In an aspect, each of the relay UEs 504, 506, 508 may send a respective scheduling assignment corresponding to a respective second message on a physical sidelink control channel (PSCCH).

Accordingly, the EUE 510 may receive a set of second messages from the set of relay UEs 504, 506, 508. In an aspect, the EUE 510 may transmit a third message to one or more of the relay UEs 504, 506, 508 based on a respective second message received from the one or more relay UEs 504, 506, 508. For example, the EUE 510 may transmit a third message to the relay UE 504, based on the second message from the relay UE 504, to indicate that the EUE 510 would like to establish a relay connection through the relay UE 504.

In an aspect, the EUE 510 may select a relay based on the set of second messages. When the EUE 510 receives more than one second message (e.g., a plurality of relay association messages from a plurality of relay UEs 504, 506, 508), the EUE 510 may select one device to act as the relay. For example, the EUE 510 may select the relay UE 504 to serve as the relay for the EUE 510 when connecting to the base station 502. In an aspect, the EUE 510 may use information received in one or more second messages of the set of second messages (e.g., relay association messages) when selecting between two or more relay UEs 504, 506, 508 of the set of relay UEs.

In an aspect, the EUE 510 may choose to establish a relay connection with the relay UE for which the EUE 510 first received a second message. For example, the EUE 510 may select the relay UE 504 because the EUE 510 received a second message from that relay UE 504 before respective second messages from other relay UEs 506, 508.

In an aspect, the EUE 510 may select a relay UE based on a different criterion or by weighing multiple criteria. For example, the EUE 510 may determine a relay UE based on criteria such as respective link quality between the EUE 510 and one or more relay UEs 504, 506, 508. In an aspect, the EUE 510 may select a relay UE based on information associated with each second message of the set of second messages, such as reference signal received power (RSRP) and/or reference signal received quality (RSRQ) measurements based on reference signals, a measured bit rate, or whether a relay UE 504, 506, 508 is connected to a target wireless network, APN, or base station.

In an aspect, the EUE 510 may store information relating to one or more received second messages (e.g., information from relay association messages). For example, in an aspect, the EUE 510 may receive second messages from relay UEs 504, 506, 508 and store information for the unselected relay UEs 506, 508.

Based on the set of second messages, the EUE 510 may transmit a third message to a relay UE of the set of relay UEs 504, 506, 508 in association with establishing a relay connection. In one aspect, the third message may be a relay association message. Accordingly, a relay UE (e.g., the relay UE 504) may initiate a relay connection through transmission of a relay association message, as described in one aspect, whereas a EUE (e.g., the EUE 510) may initiate the relay connection through transmission of a relay association message in another aspect. The third message (e.g., the relay association message) may include, for example, an ID associated with the EUE 510, a relay service code, one or more service requirements, one or more IDs of one or more PLMNs in which the EUE 510 is interested, or other information associated with a desired relay connection (e.g., information about a base station, information about an APN).

In another aspect, the third message may be a relay association response message responsive to one or more second messages that are relay association messages. In other words, when the set of relay UEs 504, 506, 508 transmits a set of relay association messages in response to the first message, the EUE 510 may respond to one or more of those relay association messages with one or more relay association responses.

In one aspect, the EUE 510 may send a relay association response to the selected relay UE to confirm the relay connection and/or establish connection with the selected relay UE. For example, the EUE 510 may select the relay UE 504 and may transmit an indication of the selection to the selected relay UE 504. In an aspect, the third message may be an acknowledgement (ACK) message to establish the relay connection.

In an aspect, the EUE 510 may respond to one or more relay UEs of the set of relay UEs 504, 506, 508 that are unselected. For example, the EUE 510 may select the relay UE 504 and transmit a third message (e.g., an ACK message) thereto, and the EUE 510 may further transmit respective fourth messages to each of the unselected relay UEs 506, 508 to indicate that those relay UEs 506, 508 are not selected for a relay connection. In an aspect, the EUE 510 may send a rejection message in a fourth message (e.g., a relay association response message) to the unselected relay UEs 506, 508 in the form of a negative acknowledgement (NACK) to explicitly reject the attempted establishment of a connection from the unselected relay UEs 506, 508.

Alternatively, the EUE 510 may refrain from transmitting any messages to the unselected relay UEs 506, 508. In an aspect, the relay UEs 504, 506, 508 may include a timer associated with reception of messages from a EUE (e.g., reception of relay association responses from the EUE 510). If a predetermined duration of the timer elapses before reception of a third message, a relay UE (e.g., the relay UE 506, the relay UE 508) may determine that the EUE did not select that relay UE for establishment of the connection and that relay UE may abandon attempts for establishment.

Once the EUE 510 sends the third message (e.g., a relay association response indicating acknowledgement of the relay association message), the EUE 510 and the selected relay UE 504 may establish a relay connection. In an aspect, the relay connection established between the EUE 510 and the relay UE 504 may adhere to one or more service requirements specified in a message from the EUE 510 (e.g., one or more service requirements indicated by a first message associated with discovery or one or more service requirements indicated by a third message associated with relay association).

Accordingly, the EUE 510 may connect to one or more devices and/or networks through the relay UE 504 with the established relay connection. For example, when outside of the coverage area of the base station 502, the EUE 510 may connect to the WWAN through the relay UE 504. Further, the EUE 510 may be able to connect to the network device 560 via the base station 502 through the relay UE 504 using the established relay connection.

In an aspect, the EUE 510 may determine that the relay connection through the relay UE 504 is degraded and/or unnecessary. For example, the relay UE 504 and/or the EUE 510 may move locations, affecting the quality of the relay connection. Thus, the EUE 510 may determine that the relay connection is to be terminated. Accordingly, the EUE 510 may transmit a fifth message to the selected relay UE 504 to end the established relay connection.

In an aspect, the EUE 510 may establish a new relay connection. For example, the EUE 510 may access information stored from one or more of the second messages received from the originally unselected UEs 506, 508. The EUE 510 may select one of the originally unselected UEs 506, 508 to establish a new relay connection. For example, the EUE 510 may select the relay UE 506 to establish a new relay connection. The EUE 510 may then transmit a new third message to the newly selected relay UE 506 to establish the new relay connection. For example, the EUE 510 may transmit a new third message as a relay association message or a relay association response.

Figure 6:
FIG. 6 <non-standard, unique system/frequency/chart/message transfer figure that is unique to this application (if applicable, usually provided by inventors)>.

FIG. 6 a flow diagram illustrating an aspect of wireless communication between a EUE 601 and one or more relay UEs 603, 605. For example, the flow diagram 600 may illustrate messages sent between a EUE 510 and one or more relay UEs 504, 506, 508, as illustrated in FIG. 5.

In an aspect, the EUE 601 may send a first message to each of relay UE 603 and relay UE 605. In an aspect, the first message may be a ProSe Discovery message 610 to a first relay UE 603 and a ProSe Discovery message 612 to a second relay UE 605. In an aspect, the ProSe Discovery messages 610, 612 may be a single message broadcast by EUE 601 that is received by relay UEs 603, 605. In an aspect, the ProSe Discovery messages 610, 612 may be carried on a PSDCH.

In an aspect, the ProSe Discovery messages 610, 612 may each include information that indicates, for example, an intention of the EUE 601 to connect to the wireless communications network using a relay device. In an aspect, the ProSe Discovery messages may include additional information, such as an ID of the EUE 601. For example, the ProSe Discovery messages 610, 612 may include a L2 ID of the EUE 601. In an aspect, the ProSe Discovery messages 610, 612 may also include an ID of a network the EUE 601 intends to join. For example, the EUE 601 may include one or more PLMN IDs for specific networks the EUE 601 belongs to or to which the EUE 601 wants to connect. Alternatively, the ProSe Discovery messages 610, 612 may include an indication that the EUE 601 intends to connect to any network and thus does not include a PLMN ID as a specific target.

In an aspect, the ProSe Discovery messages 610, 612 may also include one or more service requirements. In an aspect, the service requirements may include one or more metrics related to the service required by the EUE 601 should the EUE 601 establish a connection to the network via a relay UE 603 or 605. For example, the EUE 601 may require a specified link quality, a specified bit rate, a secure connection, etc. when attempting to establish a relay connection with the wireless network.

In an aspect, the first and second relay UEs 603, 605 may send respective second messages based on the respective ProSe Discovery messages 610, 612. In one aspect, a first relay UE 603 may send a respective second message as a Relay Association message 614 to the EUE 601. Similarly, a second relay UE 605 may send a respective second message as a Relay Association message 616 to the EUE 601. The relay UEs 603, 605 may send Relay Association messages 614, 616 on a PSSCH and may use a PSCCH for sending the corresponding scheduling assignment.

According to one aspect, the relay UEs 603, 605 may send the Relay Association messages 614, 616 in response to an indication from a base station (e.g., the base station 502 of FIG. 5). In an aspect, the relay UEs 603, 605 may respectively forward the ProSe Discovery messages 610, 612 to a base station that is respectively serving the relay UEs 603, 605. In an aspect, the base station may be the same base station. In another aspect, relay UEs 603, 605 are connected to different base stations. In an aspect, the relay UEs 603, 605 may send the respective Relay Association messages 614, 616 based directly on receiving and processing the respective ProSe Discovery messages 610, 612. The relay UEs 603, 605 may respectively determine, based on the contents of the respective ProSe Discovery messages 610, 612, that the respective relay UE 603, 605 is capable of acting as a relay for the EUE 601.

At operation 618, the EUE 601 may choose one of the relay UEs 603, 605 with which to establish a relay connection. In an aspect, the EUE 601 may respond to one or more Relay Association messages 614, 616 based on selection of one of the relay UEs 603, 605 to serve as a relay for establishing a connection between the EUE 601 and a wireless network (e.g., a WWAN or another similar network). In an aspect, when the EUE 601 receives more than one Relay Association message 614, 616, the EUE 601 may select one of the relay UEs 603, 605 to act as the relay. In an aspect, the EUE 601 may save information associated with one or more received Relay Association messages 614, 616 (including the unselected one of the relay UEs 603, 605). For example, in an aspect, the EUE 601 may receive Relay Association messages 614, 616 and save information for the respective relay UEs 603, 605.

The EUE 601 may select a relay UE 603 to serve as the relay for the EUE 603 when connecting to a wireless network (e.g., a WWAN). In an aspect, the EUE 601 may use information received in the Relay Association messages 614, 616 when selecting between two or more relay UEs 603, 605. In an aspect, the EUE 601 may choose to establish a relay connection with the one of the relay UEs 603, 605 from which the EUE 601 first received a one of the Relay Association messages 614, 616. For example, the EUE 601 may choose relay UE 603 because the EUE 601 received Relay Association message 614 from relay UE 603 before Relay Association message 616 from relay UE 605. In an aspect, the EUE 601 may choose one of the relay UEs 603, 605 based on a different criterion or by weighing multiple criteria. For example, the EUE 601 may select one of the relay UEs 603, 605 based on criteria such as a link quality between the EUE 601 and each of the relay UEs 603, 605 and/or information received in the Relay Association messages 614, 616 (e.g., RSRP/RSRQ measurements based on reference signals, measured bit rate, or whether one of the relay UEs 603, 605 is connected to a target wireless network, APN, or base station).

After the EUE 601 selects one of the relay UEs 603, 605 with which to establish a relay connection, the EUE 601 may send a third message to the selected one of the relay UEs 603, 605. In an aspect, the third message is a Relay Association response 620, which confirms the relay connection and/or initiates establishment of the relay connection with the selected relay UE 603. For example, the Relay Association response 620 that is sent by the EUE 601 to the selected relay UE 603 may be an ACK message associated with establishing the relay connection.

In an aspect, the EUE 601 may send a fourth message to one or more unselected relay UEs. In an aspect, the fourth message is a Relay Association response 622, which indicates that the relay UE 605 is not selected for the relay connection. For example, the EUE 601 may send a rejection message in a Relay Association response 622 to the unselected relay UE 605 in the form of a NACK to explicitly reject the attempted establishment of a relay connection through the relay UE 605.

Alternatively, in an aspect, the EUE 601 may abstain from sending any messages to the unselected relay UE 605. In an aspect, one or more of the relay UEs 603, 605 may include a timer associated with reception of an acknowledgement Relay Association response 620 from the EUE 601. If the duration of the timer elapses before reception of the Relay Association response 620, an unselected relay UE 605 may determine that the EUE 601 did not select that relay UE 605 for establishment of the relay connection. The unselected relay UE 605 may abandon attempts for establishment of a relay connection with the EUE 601.

After the EUE 601 sends the acknowledgement Relay Association response 620 to the relay UE 603, the EUE 601 and the selected relay UE 603 may establish a relay connection 624. In an aspect, the relay connection 624 established between the EUE 601 and the selected relay UE 603 may adhere to the one or more service requirements specified in the ProSe Discovery message 610.

Figure 7:
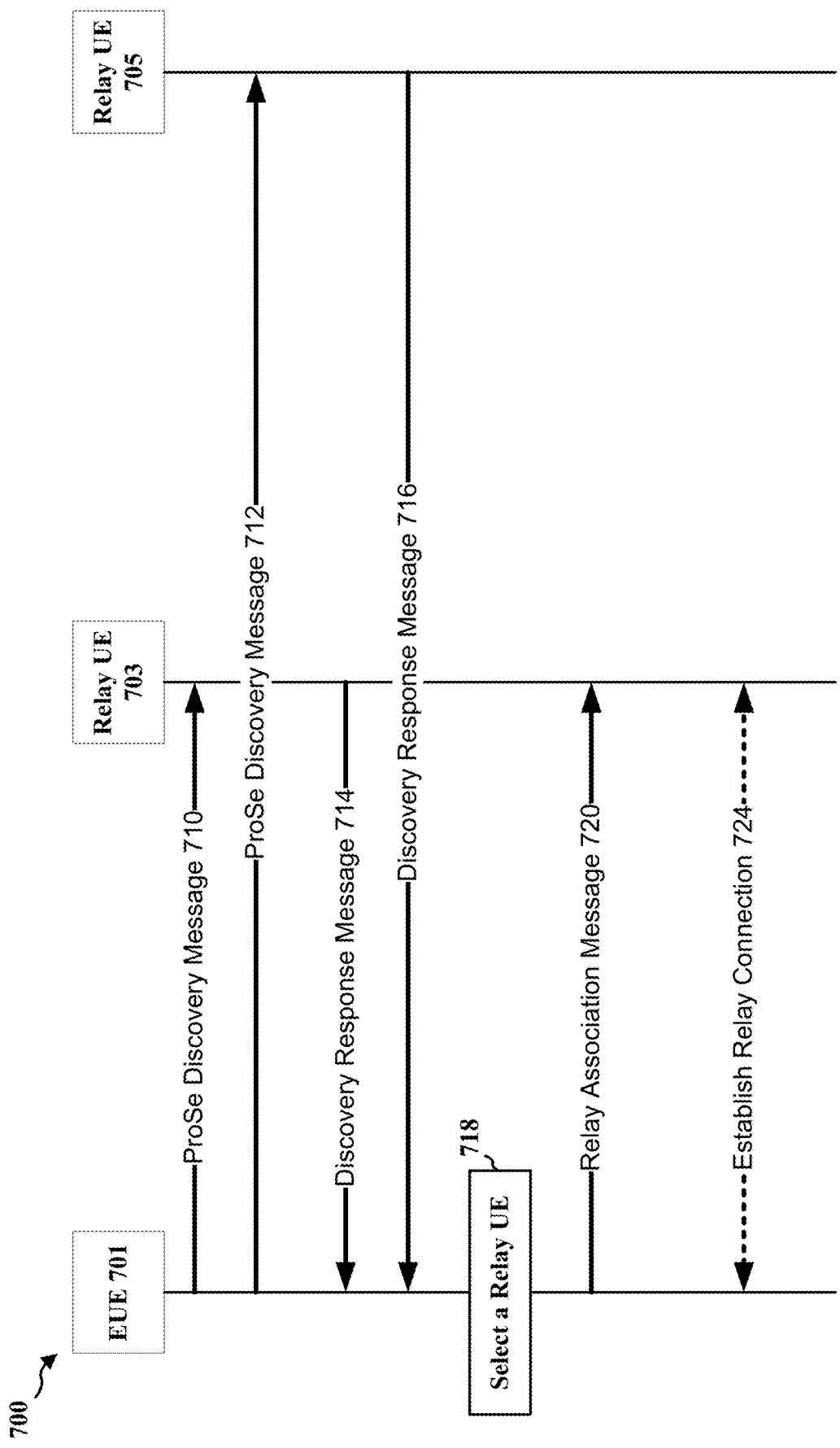
FIG. 7 <non-standard, unique system/frequency/chart/message transfer figure that is unique to this application (if applicable, usually provided by inventors)>.

FIG. 7 a flow diagram illustrating an aspect of wireless communication between a EUE 701 and one or more relay UEs 703, 705. For example, the flow diagram 700 may illustrate messages sent between a EUE 510 and one or more relay UEs 504, 506, 508, as illustrated in FIG. 5.

In an aspect, the EUE 701 may send a first message to relay UE 703 and relay UE 705. In an aspect, the first message may be individual messages, e.g., a ProSe Discovery message 710 to relay UE 703 and a ProSe Discovery message 712 to second relay UE 705. In an aspect, the ProSe Discovery messages 710, 712 may be a single message broadcast by EUE 701 that is received by relay UEs 703, 705. In an aspect, the ProSe Discovery messages 710, 712 may be carried on a PSDCH.

In an aspect, the ProSe Discovery messages 710, 712 may each include information associated with the EUE 701. For example, the ProSe Discovery messages 710, 712 may indicate an intention of the EUE 701 to connect to a wireless communications network using a relay device. In an aspect, the ProSe Discovery messages 710, 712 may include additional information, such as an ID of the EUE 701. For example, the ProSe Discovery messages 710, 712 may include a L2 ID of the EUE 701. In an aspect, the ProSe Discovery messages 710, 712 may also include an ID of a network the EUE 701 intends to join. For example, the EUE 701 may include one or more PLMN IDs for specific networks to which the EUE 701 belongs or wants to connect. Alternatively, the ProSe Discovery messages 710, 712 may include an indication that the EUE 701 intends to connect to any network and thus does not include a PLMN ID as a specific target.

In an aspect, the ProSe Discovery messages 710, 712 may also include one or more service requirements. In an aspect, the service requirements may include one or more metrics related to the service required by the EUE 701 should the EUE 701 establish a connection to the network via a relay UE. For example, the EUE 701 may require a specified link quality, a specified bit rate, a secure connection, etc. when attempting to establish a relay connection with the wireless network.

In an aspect, the ProSe Discovery messages 710, 712 may include an ID associated with one or more relay UEs, such as one of more of the relay UEs 703, 705. For example, the ID may be a ProSe relay UE ID, which may be a link layer identifier used for direct communication and may be associated with a relay service code. In an aspect, the ID may be an L2 ID associated with one or more relay UEs, such as one or more of the relay UEs 703, 705.

In an aspect, the first and second relay UEs 703, 705 may send respective second messages based on the respective ProSe Discovery messages 710, 712. In one aspect, a first relay UE 703 may send a respective second message as a Discovery Response message 714 to the EUE 701. Similarly, a second relay UE 705 may send a respective second message as a Discovery Response message 716 to the EUE 701. In one aspect, each Discovery Response message 714, 716 may indicate the respective availability of the respective relay UE 703, 705 as a relay device. In an aspect, a respective Discovery Response message 714, 716 may include an ID of a respective relay UE 703, 705. For example, a Discovery Response message 714 from the relay UE 703 may include a link layer identifier that is used for direct communication and may be associated with a relay service code. In an aspect, the ID may be an L2 ID.

At operation 718, the EUE 701 may choose one of the relay UEs 703, 705 with which to establish a relay connection. In an aspect, the EUE 701 may respond to one or more Discovery Response messages 714, 716 based on selection of one of the relay UEs 703, 705 to serve as a relay for establishing a connection between the EUE 701 and a wireless network (e.g., a WWAN or another similar network). In an aspect, when the EUE 701 receives more than one Discovery Response message 714, 716, the EUE 701 may select one of the relay UEs 703, 705 to act as the relay. In an aspect, the EUE 701 may save information associated with one or more received Discovery Response messages 714, 716 (including the unselected one of the relay UEs 703, 705). For example, in an aspect, the EUE 701 may receive Discovery Response messages 714, 716 and save information for the respective sending relay UEs 703, 705.

The EUE 701 may select a relay UE 703 to serve as the relay for the EUE 701 when connecting to a wireless network (e.g., a WWAN). In an aspect, the EUE 701 may use information received in the Discovery Response messages 714, 716 when selecting between two or more relay UEs 703, 705. In an aspect, the EUE 701 may choose to establish a relay connection with the one of the relay UEs 703, 705 from which the EUE 701 first received a one of the Discovery Response messages 714, 716. For example, the EUE 701 may choose relay UE 703 because the EUE 701 received a Discovery Response message 714 from relay UE 703 before a Discovery Response message 716 from relay UE 705. In an aspect, the EUE 701 may choose one of the relay UEs 703, 705 based on a different criterion or by weighing multiple criteria. For example, the EUE 701 may select one of the relay UEs 703, 705 based on criteria such as a link quality between the EUE 701 and each of the relay UEs 703, 705 and/or information received in the Discovery Response messages 714, 716 (e.g., RSRP/RSRQ measurements based on reference signals, measured bit rate, or whether one of the relay UEs 703, 705 is connected to a target wireless network, APN, or base station).

After the EUE 701 selects one of the relay UEs 703, 705, the EUE 701 may send a third message to the selected one of the relay UEs 703, 705. In an aspect, the third message is a Relay Association message 720, which requests establishment of the relay connection with the selected relay UE 703. In various aspects, the Relay Association message 720 that is sent by the EUE 701 to the selected relay UE 703 may include information associated with the EUE 701. In various aspects, the Relay Association message 720 may include information similar to that described with respect to the ProSe Discovery messages 710, 712. However, such information may occur in the Relay Association message 720 instead of the ProSe Discovery messages 710, 712.

In an aspect, the Relay Association message 720 may include an ID of the EUE 701 (e.g., a L2 ID of the EUE 701). In an aspect, the Relay Association message 720 may include an ID of a network the EUE 701 intends to join. For example, the EUE 701 may include one or more PLMN IDs for specific networks to which the EUE 701 belongs or wants to connect. Alternatively, the Relay Association message 720 may include an indication that the EUE 701 intends to connect to any network and thus does not include a PLMN ID as a specific target.

In an aspect, the Relay Association message 720 may include one or more service requirements. In an aspect, the service requirements may include one or more metrics related to a service of interest to the EUE 701 should the EUE 701 establish a connection to the network via a relay UE 703 or 705. For example, the EUE 701 may require a specified link quality, a specified bit rate, a secure connection, etc. when attempting to establish a relay connection with the wireless network.

After the EUE 701 sends the Relay Association message 720 to the relay UE 703, the EUE 701 and the selected relay UE 703 may establish a relay connection 724. In an aspect, the relay connection 724 established between the EUE 701 and the selected relay UE 703 may adhere to the one or more service requirements specified in the ProSe Discovery message 710 and/or Relay Association message 720. In an aspect, the selected relay UE 703 may set up the establishment of the relay connection 724, for example, by scheduling resources for the EUE 701. The selected relay UE 703 may send a scheduling assignment associated with establishing the relay connection 724 on a PSCCH.

Although FIG. 7 illustrates an aspect in which the EUE 701 selects the first relay UE 703, the present disclosure comprehends aspects in which the EUE 701 selects the second relay UE 705. Similarly, FIG. 6 illustrates an aspect in which the EUE 601 selects the first relay UE 603, the present disclosure comprehends aspects in which the EUE 601 selects the second relay UE 605. That is, the arrangement of FIG. 6 and FIG. 7 is to be regarded as illustrative and not limiting.

Figure 8:
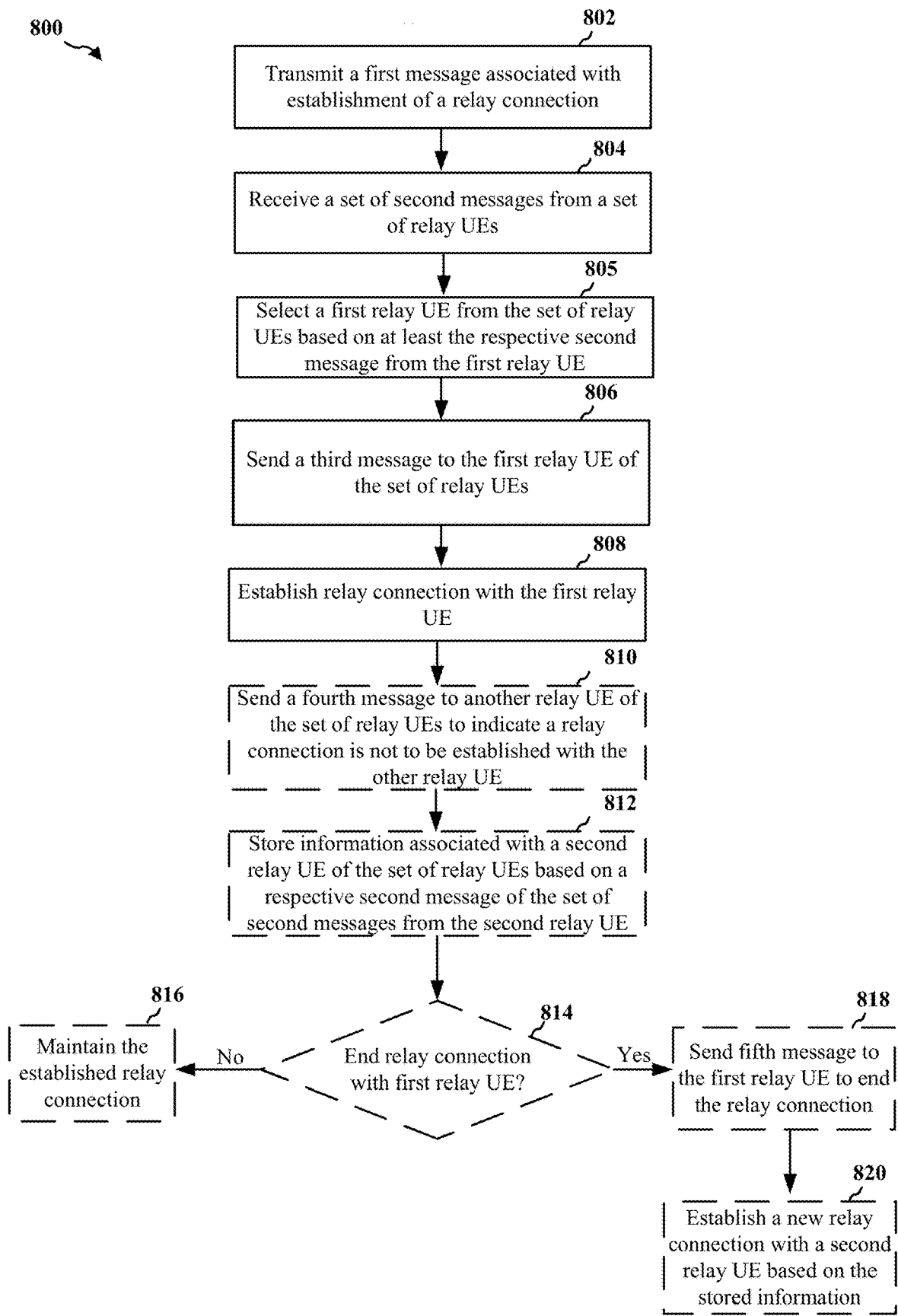
FIG. 8 <non-standard, unique system/frequency/chart/message transfer figure that is unique to this application (if applicable, usually provided by inventors)>.

Now with reference to FIG. 8, a flowchart illustrates an aspect of a method 800 for wireless communication. The method 800 may be performed by a UE, such as the EUE 510 of FIG. 5, the EUE 601 of FIG. 6, and/or the EUE 701 of FIG. 7. In FIG. 8, various operations are illustrated as optional (e.g., denoted by dashed lines). However, the present disclosure contemplates operations in which one or more operations of the method 800 are optional, omitted, and/or alternatively performed according to various aspects. Further, one or more operations of the method 800 may be transposed and/or contemporaneously performed.

Beginning first with operation 802, a EUE may transmit a first message associated with establishment of a relay connection. In aspects, the first message may include an ID associated with the EUE. In an aspect, the EUE may broadcast the first message. In another aspect, the EUE may transmit the first message via unicast (e.g., to a relay UE).

In the context of FIG. 5, the EUE 510 may transmit a first message to one or more of the relay UEs 504, 506, 508. In the context of FIG. 6, the EUE 601 may transmit the ProSe Discovery messages 610, 612 to the relay UEs 603, 605 via respective unicast transmissions to each relay or via a broadcast transmission to both relays. In the context of FIG. 7, the EUE 701 may transmit the ProSe Discovery messages 710, 712 to the relay UEs 703, 705 via respective unicast transmissions to each relay or via a broadcast transmission to both relays.

At operation 804, the EUE may receive a set of second messages from a set of relay UEs. In an aspect, the set of relay UEs may be one relay UE. In another aspect, the set of relay UEs may include a plurality of relay UEs. In an aspect, the EUE may receive a respective second message from each of the relay UEs that receives a first message from the EUE. In an aspect, the EUE may receive a respective second message from a relay UE based on information included in a respective first message. For example, a relay UE may respond to the EUE with a second message where the relay UE matches one or more criteria indicated in the first message, such as a relay service code and/or a PLMN ID.

In an aspect, each second message may be a Relay Association message. In another aspect, each second message may be a Discovery Response message. In the context of FIG. 5, the EUE 510 may receive a set of second messages from one or more of the relay UEs 504, 506, 508. In the context of FIG. 6, the EUE 601 may receive the Relay Association messages 614, 616 from the relay UEs 603, 605. In the context of FIG. 7, the EUE 701 may receive the Discovery Response messages 714, 716 from the relay UEs 703, 705.

At operation 805, the EUE may select a first relay UE from the set of relay UEs based at least on the respective second message from the first relay UE. In an aspect, when the set of second messages includes more than one second message, the EUE may select the first relay UE to act as the relay based on more than one second message. For example, the EUE may choose to establish a relay connection with the relay UE for which the EUE first received a second message. For example, the EUE may select a relay UE with which to establish a relay connection because the EUE received a respective second message from that relay UE before other respective second messages from other relay UEs.

In an aspect, the EUE may select a relay UE based on a different criterion or by weighing multiple criteria. For example, the EUE may determine a relay UE based on criteria such as link quality between the EUE and one or more relay UEs. In an aspect, the EUE may select a relay UE based on information associated with each second message of the set of second messages, such as RSRP and/or RSRQ measurements based on reference signals, a measured bit rate, or whether a relay UE is connected to a target wireless network, APN, or base station.

In the context of FIG. 5, the EUE 510 may select the first relay UE 504, rather than select the other relay UEs 506, 508. In the context of FIG. 6, the EUE 601 may perform operation 618 to select the first relay UE 603. In the context of FIG. 7, the EUE 701 may perform operation 718 to select the first relay UE 703.

At operation 806, the EUE may send a third message to the first relay UE of the set of relay UEs. In an aspect, this third message may be a Relay Association message. In another aspect, this third message may be a Relay Association response, which indicates to the first relay UE that the EUE has selected that first relay UE as a relay based on a Relay Association message from that first UE.

In the context of FIG. 5, the EUE 510 may send a third message to the first relay UE 504. In the context of FIG. 6, the EUE 601 may send the Relay Association response 620 to the relay UE 603. In the context of FIG. 7, the EUE 701 may send the Relay Association message 720 to the relay UE 703.

At operation 808, the EUE may establish a relay connection with the first relay UE to which the EUE transmitted the third message. In an aspect, the relay connection established between the EUE and the first relay UE may adhere to the one or more service requirements specified in the first message and/or third message.

In the context of FIG. 5, the EUE 510 may establish the relay connection to the first relay UE 504. In the context of FIG. 6, the EUE 601 may establish the relay connection 624 with the first relay UE 603. In the context of FIG. 7, the EUE may establish the relay connection 724 with the first relay UE 703.

At operation 810, the EUE may send a fourth message to another relay UE of the set of relay UEs to indicate that a relay connection is not to be established with the other relay UE. In the context of FIG. 5, the EUE 510 may send a fourth message to one or both of the other relay UEs 506, 508. In the context of FIG. 6, the EUE 601 may send the Relay Association response (NACK) 622 to the other relay UE 605. In the context of FIG. 7, the EUE 701 may send a fourth message to the unselected relay UE 705.

At operation 812, the EUE may store information associated with a second relay UE of the set of relay UEs based on a respective second message received from that second relay UE. For example, the EUE may store an ID of the second relay. In another aspect, the EUE may store information associated with service and/or connectivity of the second relay UE, such as one or more IDs of one or more PLMNs to which the second relay UE may connect, one or more IDs of one or more base stations, information associated with APNs, service codes, and the like. The EUE may store information for each relay UE of the set of relay UEs.

In the context of FIG. 5, the EUE 510 may store information for the other relay UEs 506, 508. In the context of FIG. 6, the EUE 601 may store information for the other relay UE 605. In the context of FIG. 7, the EUE 701 may store information for the other relay UE 705.

At operation 814, the EUE may determine whether the relay connection with the first relay UE is to be ended. For example, the EUE may determine that the relay connection becomes degraded and/or unnecessary. For example, the first relay UE and/or the EUE may change locations, which may affect the quality of the relay connection.

In the context of FIG. 5, the EUE 510 may determine whether the relay connection with the first relay UE 504 is to be ended. In the context of FIG. 6, the EUE 601 may determine whether the relay connection with the first relay UE 603 is to be ended. In the context of FIG. 7, the EUE 701 may determine whether the relay connection with the first relay UE 703 is to be ended.

If the EUE determines that the relay connection is not to be ended, the EUE may maintain the established relay connection, as shown at operation 816. However, if the EUE determines that the established relay connection is to be ended, the EUE may send a fifth message to the first relay UE to end the relay connection, as shown at operation 818.

In the context of FIG. 5, the EUE 510 may send a fifth message to the first relay UE 504 to end the established relay connection. In the context of FIG. 6, the EUE 601 may send a fifth message to the first relay UE 603 to end the established relay connection 624. In the context of FIG. 7, the EUE 701 may send a fifth message to the first relay UE 703 to end the established relay connection 724.

At operation 820, the EUE may establish a new relay connection based on the stored information for a second relay UE. For example, the EUE may send a new third message (e.g., a Relay Association message, a Relay Association response, etc.) to the newly selected second relay UE of the set of relay UEs.

In the context of FIG. 5, the EUE 510 may establish a new relay connection with either of the other relay UEs 506, 508. In the context of FIG. 6, the EUE 601 may establish a new relay connection with the second relay UE 605. In the context of FIG. 7, the EUE 701 may establish a new relay connection with the second relay UE 705.

Figure 9:
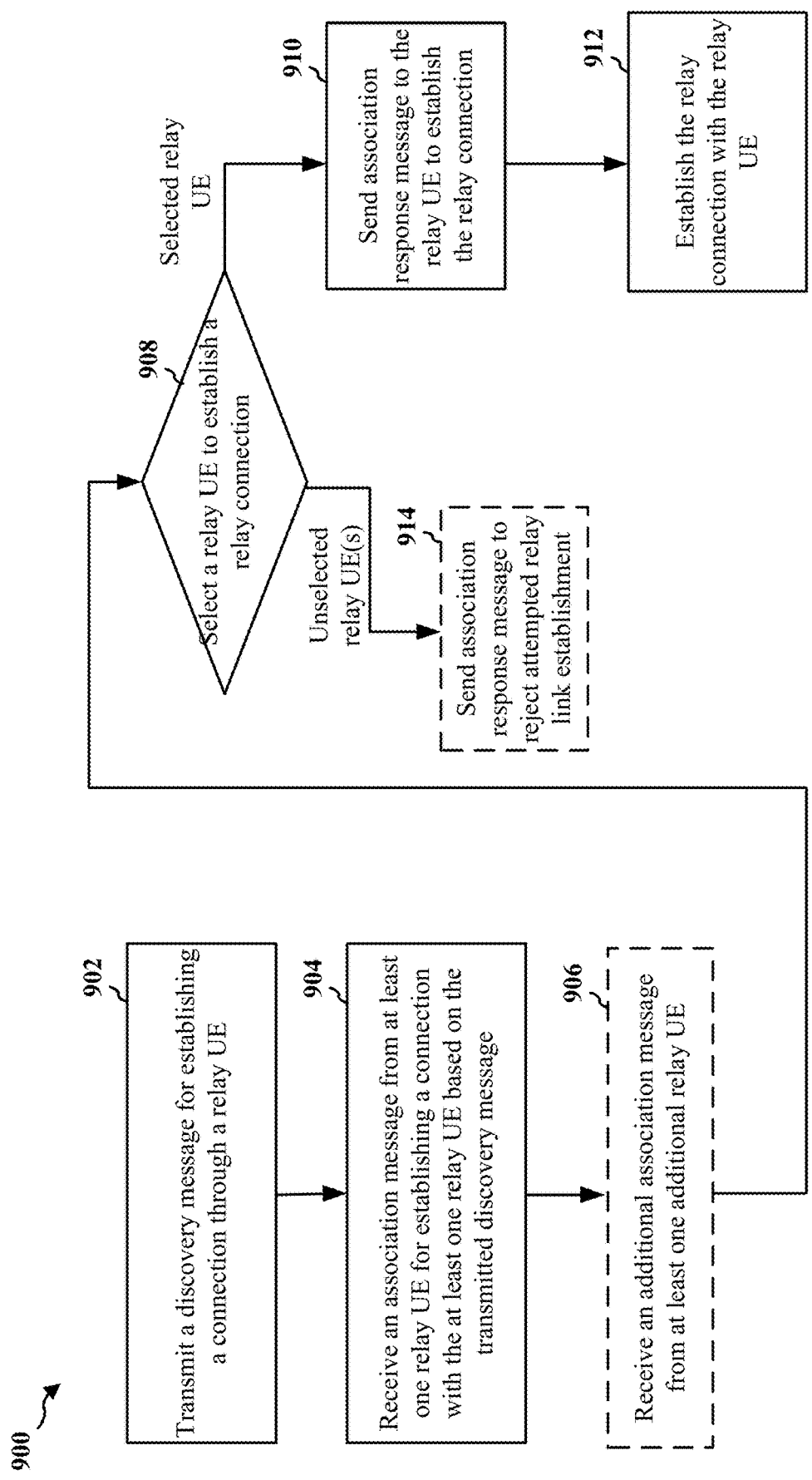
FIG. 9 is a flowchart of a method of wireless communication.

With respect to FIG. 9, a flowchart illustrates an aspect of a method 900 for wireless communication. The method 900 may be performed by a EUE, such as the EUE 510 of FIG. 5 and/or the EUE 601 of FIG. 6. In FIG. 9, various operations are illustrated as optional (e.g., denoted by dashed lines). However, the present disclosure contemplates operations in which one or more operations of the method 900 are optional, omitted, and/or alternatively performed according to various aspects. Further, one or more operations of the method 900 may be transposed and/or contemporaneously performed.

At operation 902, a EUE may transmit a discovery message for establishing a connection to a wireless communications network through a relay. In the context of FIG. 5, the EUE 510 may transmit a first message to one or more of the relay UEs 504, 506, 508. In the context of FIG. 6, the EUE 601 may send ProSe Discovery message 610 to a first relay UE 603 and may send ProSe Discovery message 612 to the second relay UE 605. In an aspect, the EUE 601 can broadcast ProSe Discovery messages 610, 612 to relay UEs 603, 605.

At operation 904, the EUE may receive an association message from a relay UE for establishing a connection with that relay UE based on the transmitted discovery message. In the context of FIG. 5, the EUE 510 may receive a second message from the relay UE 503. In the context of FIG. 6, the EUE 601 may receive a Relay Association message 614 from the relay UE 603. In an aspect, the Relay Association message 614 may be based on the ProSe Discovery message 610 received by the relay UE 603. In an aspect, the EUE 601 may store association information from the Relay Association message 614 received from the relay UE 603.

At operation 906, the EUE may receive at least one additional association message from at least one additional relay UE for establishing a connection with the at least one additional relay UE based on the transmitted discovery message(s). In the context of FIG. 5, the EUE 510 may receive additional second messages from other relay UEs 506, 508, in addition to the second message from the relay UE 504. In the context of FIG. 6, the EUE 601 may additionally receive Relay Association message 616 from the other relay UE 605 in response to the ProSe Discovery message 612. In an aspect, the EUE 601 can optionally store association information from the Relay Association message 616.

At operation 908, the EUE may select a relay UE with which to establish a relay connection based on the received Relay Association message(s). For example, the EUE may receive a set of association messages and then select a relay UE based on the set of association messages. In an aspect, the EUE may select a relay UE based on one or more criteria, such as which association message is received first. In the context of FIG. 5, the EUE 510 may select the relay UE 504 based on the set of second messages from the one or more relay UEs 504, 506, 508. In the context of FIG. 6, the EUE 601 may perform operation 618 to select the relay UE 603 based on the Relay Association messages 614, 616.

At operation 910, the EUE may send a response message to confirm establishment of the connection with the selected relay UE. In the context of FIG. 5, the EUE 510 may transmit a third message to the selected relay UE 504. In the context of FIG. 6, the EUE 601 may send a Relay Association response (ACK) 620 to the selected relay UE 603.

At operation 912, the EUE may establish a relay connection with the selected relay UE. In the context of FIG. 5, the EUE 510 may establish a relay connection with the selected relay UE 504. In the context of FIG. 6, the EUE 601 may establish a relay connection 624 with the selected relay UE 603.

At operation 914, the EUE may send a rejection message to at least one of the selected relay UEs. In the context of FIG. 5, the EUE 510 may send a fifth message to the unselected relay UEs 506, 508. In the context of FIG. 6, the EUE 601 may send a Relay Association response (NACK) 622 to the unselected relay UE 605.

Figure 10:
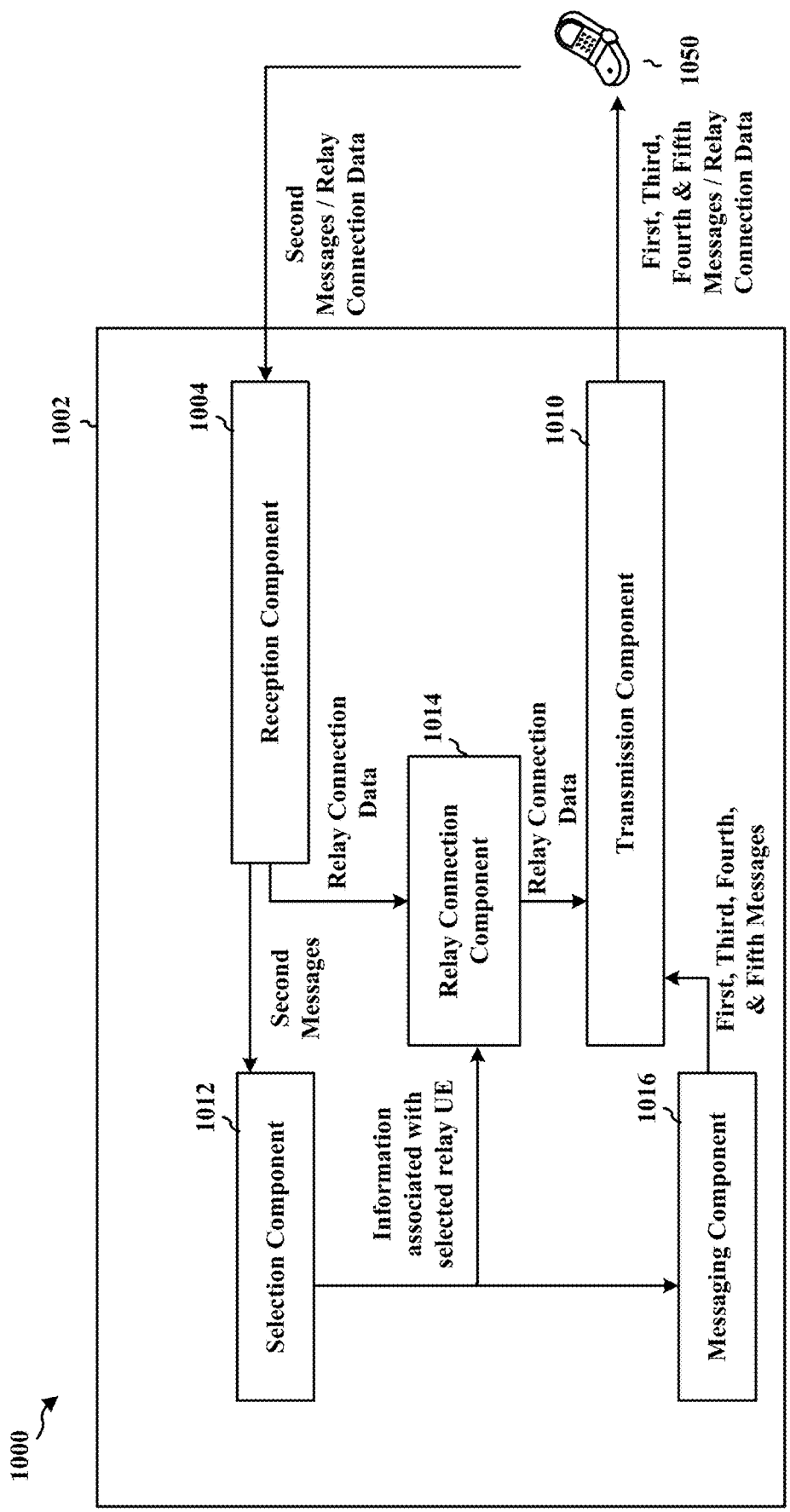
FIG. 10 is a conceptual data flow diagram illustrating the data flow between different means/components in an exemplary apparatus.

FIG. 10 is a conceptual data flow diagram 1000 illustrating the data flow between different means/components in an exemplary apparatus 1002. The apparatus 1002 may be a UE, such as the EUE 510, the EUE 601, and/or the EUE 701. The apparatus 1002 depicts exemplary connections and/or data between different modules/means/components. It is to be understood that such connections and/or data flow are to be regarded in as illustrative and, therefore, different and/or additional connections and/or data flow may be present in different aspects.

The apparatus 1002 may include a transmission component 1010 configured to transmit messages, for example, to a relay UE 1050. In an aspect, the transmission component 1010 may be coupled to a messaging component 1016. In an aspect, the transmission component 1010 may cause one or more messages (e.g., a first message) to be transmitted on a PSDCH.

The messaging component 1016 may generate messages to be transmitted by the transmission component 1010. In an aspect, the messaging component 1016 may be configured to generate at least a first message associated with discovery (e.g., discovery of the apparatus 1002 and/or discovery of a relay UE, such as the relay UE 1050). In an aspect, the messaging component may be configured to generate the first message to include at least an ID of the apparatus 1002. In an aspect, the ID may be a L2 ID associated with the apparatus 1002.

In various aspects, the messaging component 1016 may generate a first message to may indicate an intention of the apparatus 1002 to connect to a wireless communications network using a relay device. In an aspect, the messaging component 1016 may generate a first message to include additional information, such as an ID of a network the apparatus 1002 intends to join or an indication that the apparatus 1002 intends to connect to any network. In an aspect, the messaging component 1016 may generate a first message to include a service code that indicates a service and/or resource in which the apparatus 1002 is interested. In an aspect, the messaging component 1016 may generate a first message to include one or more service requirements associated with a relay connection. In an aspect, the messaging component 1016 may generate a first message to include an ID associated with one or more relay UEs, such as the relay UE 1050. For example, the ID may be a ProSe relay UE ID, which may be a link layer identifier used for direct communication and may be associated with a relay service code.

The apparatus 1002 includes a reception component 1004 that receives signals. The reception component 1004 may receive signals from another device, such as a relay UE 1050. In an aspect, the reception component 1004 may receive information associated with a relay connection and/or discovery of another UE (e.g., the relay UE 1050). The reception component 1004 may be coupled to at least a selection component 1012 and a relay connection component 1014. In an aspect, the reception component 1004 may receive a set of second messages on a PSSCH. In an aspect, each second message of the set may correspond to a respective scheduling assignment, which may be received by the reception component 1004 on a PSCCH.

Through the reception component 1004, the selection component 1012 may receive a set of second messages from a set of relay UEs. For example, the selection component 1012 may receive a second message from the relay UE 1050 based on a first message transmitted by the transmission component 1010. In an aspect, the second message may be a relay association message (e.g., a request to establish a relay connection). In another aspect, the second message may be an indication of the availability of the relay UE 1050 (e.g., an indication that the relay UE 1050 is within range of the apparatus 1002).

In aspects, the selection component 1012 may be configured to select a relay based on the set of second messages. For example, the selection component 1012 may select the relay UE 1050 with which to establish a relay connection. In an aspect, the selection component 1012 may be configured to store information associated with the set of second messages, for example, so that a different relay UE may be selected at a later time.

In an aspect, the selection component 1012 may be configured to provide information associated with the selected relay UE 1050 to the messaging component 1016 and a relay connection component 1014. In one aspect, the information associated with the selected relay UE may include at least an ID of the selected relay UE 1050 (e.g., a L2 ID of the selected relay UE 1050).

In aspects, the messaging component 1016 may be configured to generate a third message based on the information associated with the selected relay UE 1050. In one aspect, the third message may be a relay association response, which acknowledges the relay association message from the relay UE 1050. In another aspect, the third message may be a relay association message (e.g., a request to establish a relay connection with the relay UE 1050). In an aspect, the third message may include an ID associated with the apparatus 1002 (e.g., a L2 ID associated with the apparatus 1002). In aspects, the messaging component 1016 may generate the third message to include additional information, such as an ID of a network the apparatus 1002 intends to join or an indication that the apparatus 1002 intends to connect to any network. In an aspect, the messaging component 1016 may generate a third message to include a service code that indicates a service and/or resource in which the apparatus 1002 is interested. In an aspect, the messaging component 1016 may generate a third message to include one or more service requirements associated with a relay connection. In an aspect, the messaging component 1016 may provide the third message to the transmission component 1010 for transmission to the selected relay UE 1050.

In aspects, the relay connection component 1014 may establish a relay connection with the selected relay UE 1050. In aspects, the selection component 1012 may provide information associated with the selected relay UE to the relay connection component 1014. In an aspect, this information may include, a scheduling assignment associated with the selected relay UE 1050 (e.g., a scheduling assignment received through the reception component 1004 in association with a second message). In an aspect, the relay connection component 1014 may be responsible for relay data transmission and/or reception through the transmission component 1010 and the reception component 1004, respectively.

The apparatus may include additional components that perform each of the blocks of the algorithm in the aforementioned diagrams and flowcharts of FIGS. 6-9. As such, each block in the aforementioned diagrams and flowcharts of FIGS. 6-9 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 11:
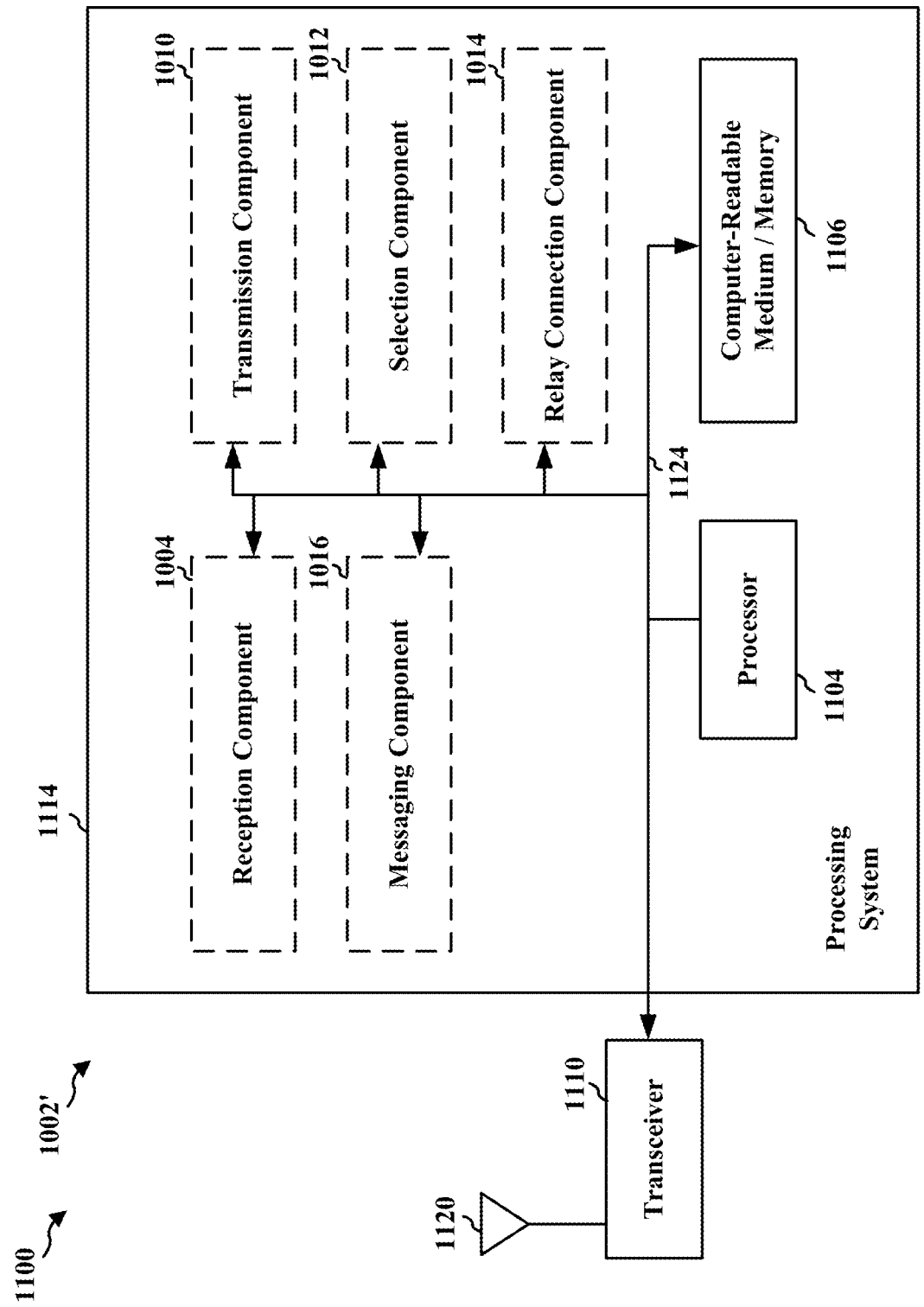
FIG. 11 is a diagram illustrating an example of a hardware implementation for an apparatus employing a processing system.

FIG. 11 is a diagram 1100 illustrating an example of a hardware implementation for an apparatus 1002' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware components, represented by the processor 1104, the components 1004, 1010, 1012, 1014, 1016, and the computer-readable medium/memory 1106. The bus 1124 may also link various other circuits such as timing sources, peripherals, voltage regulators, and power management circuits, which are well known in the art, and therefore, will not be described any further.

The processing system 1114 may be coupled to a transceiver 1110. The transceiver 1110 is coupled to one or more antennas 1120. The transceiver 1110 provides a means for communicating with various other apparatus over a transmission medium. The transceiver 1110 receives a signal from the one or more antennas 1120, extracts information from the received signal, and provides the extracted information to the processing system 1114, specifically the reception component 1004. In addition, the transceiver 1110 receives information from the processing system 1114, specifically the transmission component 1010, and based on the received information, generates a signal to be applied to the one or more antennas 1120. The processing system 1114 includes a processor 1104 coupled to a computer-readable medium/memory 1106. The processor 1104 is responsible for general processing, including the execution of software stored on the computer-readable medium/memory 1106. The software, when executed by the processor 1104, causes the processing system 1114 to perform the various functions described supra for any particular apparatus. The computer-readable medium/memory 1106 may also be used for storing data that is manipulated by the processor 1104 when executing software. The processing system 1114 further includes at least one of the components 1012, 1014, 1016. The components may be software components running in the processor 1104, resident/stored in the computer readable medium/memory 1106, one or more hardware components coupled to the processor 1104, or some combination thereof. The processing system 1114 may be a component of the UE 350 and may include the memory 360 and/or at least one of the TX processor 368, the RX processor 356, and the controller/processor 359.

In one configuration, the apparatus 1002/1002' for wireless communication may be for a first UE and may include means for means for transmitting, to a set of relay UEs, a first message associated with establishment of a relay connection. In an aspect, the first message may include a first identifier of the first UE. In an aspect, the apparatus 1002/1002' further includes means for receiving, by the first UE, a set of second messages from the set of relay UEs. In an aspect, each second message of the set of second messages may include a respective identifier of a respective relay UE of the set of relay UEs. In an aspect, the apparatus 1002/1002' further includes means for establishing the relay connection with a first relay UE of the set of relay UEs based on a first second message of the set of second messages from the first relay UE. In an aspect, the means for transmitting is further configured to transmit a third message to the first relay UE of the set of relay UEs based on the first second message of the set of second messages. In an aspect, the third message may confirm the relay connection is to be established with the first relay UE. In an aspect, the means for transmitting is further configured to transmit a fourth message to a second relay UE of the set of relay UEs based on another second message of the set of second messages. In an aspect, the fourth message may reject establishment of the relay connection with the second relay UE. In an aspect, the means for transmitting may be further configured to refrain from transmitting a fourth message to a second relay UE of the set of relay UEs.

In an aspect, the first message further includes one or more of a service requirement associated with the relay connection, an identification of a wireless communications network with which the first UE is to connect through the relay connection, an indication to establish the relay connection with any wireless communications network, or at least one identifier associated with at least one relay UE of the set of relay UEs. In an aspect, the first message includes a ProSe discovery message broadcast on a PSDCH.

In an aspect, the second message includes a Relay Association message received over a PSSCH, and a corresponding scheduling assignment is received over a PSCCH. In an aspect, the first identifier and the respective identifier are link layer identifiers.

In an aspect, the means for transmitting is further configured to transmit a fifth message to the first relay UE of the set of relay UEs, the fifth message to end the relay connection. In an aspect, the apparatus 1002/1002' further includes means for storing information associated with a second relay UE of the set of relay UEs based on another second message of the set of second messages. In an aspect, the means for establishing the relay connection is further configured to establish another relay connection with the second relay UE based on the stored information.

The aforementioned means may be one or more of the aforementioned components of the apparatus 1002 and/or the processing system 1114 of the apparatus 1002' configured to perform the functions recited by the aforementioned means. As described supra, the processing system 1114 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method for wireless communication of a user equipment (UE), the method comprising:
   transmitting, to a set of relay UEs, a first message associated with establishment of a relay connection, the first message to include a first identifier of the UE, a second identifier of a public land mobile network (PLMN) to which the UE is to connect, and one or more service requirements associated with the relay connection, wherein the first message comprises a proximity-based services (ProSe) discovery message broadcast on a physical sidelink discovery channel (PSDCH);
   receiving, by the UE, a set of second messages including a first second message from the set of relay UEs including a first relay UE, each second message of the set of second messages to include a respective identifier of a respective relay UE of the set of relay UEs, wherein the first second message is received over a physical sidelink shared channel (PSSCH) and comprises a Relay Association message having information indicating a service provided through the first relay UE;
   storing, by the UE, information associated with a second relay UE of the set of relay UEs based on another second message of the set of second messages;
   receiving, by the UE, a scheduling assignment corresponding to the first second message over a physical sidelink control channel (PSCCH); and
   establishing the relay connection with the first relay UE of the set of relay UEs based on the first second message of the set of second messages from the first relay UE.

2. The method of claim 1, further comprising:
   transmitting, by the UE, a third message to the first relay UE of the set of relay UEs based on the first second message of the set of second messages, the third message to confirm the relay connection is to be established with the first relay UE.

3. The method of claim 2, further comprising:
   transmitting, by the UE, a fourth message to a second relay UE of the set of relay UEs based on another second message of the set of second messages, the fourth message to reject establishment of a relay connection with the second relay UE.

4. The method of claim 2, further comprising:
   refraining, by the UE, from transmitting a fourth message to a second relay UE of the set of relay UEs.

5. The method of claim 1, wherein the first message further includes an indication to establish the relay connection with any wireless communications network, or at least one identifier associated with at least one relay UE of the set of relay UEs.

6. The method of claim 1, wherein the first identifier and the respective identifier are link layer identifiers.

7. The method of claim 1, further comprising:
transmitting, by the UE, a fifth message to the first relay UE of the set of relay UEs, the fifth message to end the relay connection.

8. The method of claim 1, further comprising:
establishing another relay connection with the second relay UE based on the stored information.

9. An apparatus for wireless communication by a user equipment (UE), comprising:
means for transmitting, to a set of relay UEs, a first message associated with establishment of a relay connection, the first message to include a first identifier of the UE, a second identifier of a public land mobile network (PLMN) to which the UE is to connect, and one or more service requirements associated with the relay connection, wherein the first message comprises a proximity-based services (ProSe) discovery message broadcast on a physical sidelink discovery channel (PSDCH);
means for receiving, by the UE, a set of second messages including a first second message from the set of relay UEs including a first relay UE, each second message of the set of second messages to include a respective identifier of a respective relay UE of the set of relay UEs, wherein the first second message is received over a physical sidelink shared channel (PSSCH) and comprises a Relay Association message having information indicating a service provided through the first relay UE;
means for storing, by the UE, information associated with a second relay UE of the set of relay UEs based on another second message of the set of second messages;
means for receiving, by the UE, a scheduling assignment corresponding to the first second message over a physical sidelink control channel (PSCCH); and
means for establishing the relay connection with the first relay UE of the set of relay UEs based on the first second message of the set of second messages from the first relay UE.

10. The apparatus of claim 9, wherein the means for transmitting is further configured to transmit a third message to the first relay UE of the set of relay UEs based on the first second message of the set of second messages, the third message to confirm the relay connection is to be established with the first relay UE.

11. The apparatus of claim 9, wherein the means for transmitting is further configured to transmit a fourth message to a second relay UE of the set of relay UEs based on another second message of the set of second messages, the fourth message to reject establishment of a relay connection with the second relay UE.

12. The apparatus of claim 9, wherein the means for transmitting is further configured to refrain from transmitting a fourth message to a second relay UE of the set of relay UEs.

13. The apparatus of claim 9, wherein the first message further includes an indication to establish the relay connection with any wireless communications network, or at least one identifier associated with at least one relay UE of the set of relay UEs.

14. The apparatus of claim 9, wherein the first identifier and the respective identifier are link layer identifiers.

15. The apparatus of claim 9, further wherein the means for transmitting is further configured to transmit a fifth message to the first relay UE of the set of relay UEs, the fifth message to end the relay connection.

16. The apparatus of claim 9, wherein the means for establishing the relay connection is further configured to establish another relay connection with the second relay UE based on the stored information.

17. An apparatus for wireless communication by a user equipment (UE), comprising:
a memory; and
at least one processor coupled to the memory and configured to:
transmit, to a set of relay UEs, a first message associated with establishment of a relay connection, the first message to include a first identifier of the UE, a second identifier of a public land mobile network (PLMN) to which the UE is to connect, and one or more service requirements associated with the relay connection, wherein the first message comprises a proximity-based services (ProSe) discovery message broadcast on a physical sidelink discovery channel (PSDCH);
receive a set of second messages including a first second message from the set of relay UEs including a first relay UE, each second message of the set of second messages to include a respective identifier of a respective relay UE of the set of relay UEs, wherein the first second message is received over a physical sidelink shared channel (PSSCH) and comprises a Relay Association message having information indicating a service provided through the first relay UE;
store, by the UE, information associated with a second relay UE of the set of relay UEs based on another second message of the set of second messages;
receive a scheduling assignment corresponding to the first second message over a physical sidelink control channel (PSCCH); and
establish the relay connection with the first relay UE of the set of relay UEs based on the first second message of the set of second messages from the first relay.

18. The apparatus of claim 17, wherein the at least one processor is further configured to transmit a third message to the first relay UE of the set of relay UEs based on the first second message of the set of second messages, the third message to confirm the relay connection is to be established with the first relay UE.

19. The apparatus of claim 17, wherein the at least one processor is further configured to transmit a fourth message to a second relay UE of the set of relay UEs based on another second message of the set of second messages, the fourth message to reject establishment of a relay connection with the second relay UE.

20. The apparatus of claim 17, wherein the at least one processor is further configured to refrain from transmitting a fourth message to a second relay UE of the set of relay UEs.

21. The apparatus of claim 17, wherein the first message further includes an indication to establish the relay connection with any wireless communications network, or at least one identifier associated with at least one relay UE of the set of relay UEs.

22. A non-transitory computer-readable medium storing computer executable code for wireless communication by a user equipment (UE), comprising code to:
transmit, to a set of relay UEs, a first message associated with establishment of a relay connection, the first message to include a first identifier of the UE, a second identifier of a public land mobile network (PLMN) to which the UE is to connect, and one or more service requirements associated with the relay connection, wherein the first message comprises a proximity-based services (ProSe) discovery message broadcast on a physical sidelink discovery channel (PSDCH);

receive, by the UE, a set of second messages including a first second message from the set of relay UEs including a first relay UE, each second message of the set of second messages to include a respective identifier of a respective relay UE of the set of relay UEs, wherein the first second message is received over a physical sidelink shared channel (PSSCH) and comprises a Relay Association message having information indicating a service provided through the first relay UE;

store, by the UE, information associated with a second relay UE of the set of relay UEs based on another second message of the set of second messages;

receive, by the UE, a scheduling assignment corresponding to the first second message over a physical sidelink control channel (PSCCH); and establish the relay connection with the first relay UE of the set of relay UEs based on the first second message of the set of second messages from the first relay UE.

* * * * *